T. Crosby,
Line Fastener.
No. 108,766.   Patented Nov. 1, 1870.

ATTEST:
James Thierry
S. J. Spray

INVENTOR:
T. Crosby
per atty
Thos. S. Sprague

United States Patent Office.

THEOPHILUS CROSBY, OF MANCHESTER, IOWA.

Letters Patent No. 108,766, dated November 1, 1870.

IMPROVEMENT IN LINE AND WIRE-TIGHTENERS.

The Schedule referred to in these Letters Patent and making part of the same.

*To whom it may concern:*

Be it known that I, THEOPHILUS CROSBY, of Manchester, in the county of Delaware and State of Iowa, have invented a new and useful Improvement in Clothes-Line and Wire-Fence Tightener; and I do declare that the following is a true and accurate description thereof, reference being had to the accompanying drawing and to the letters of reference marked thereon and being a part of this specification.

Like letters indicate like parts in each figure.

Figure 1:
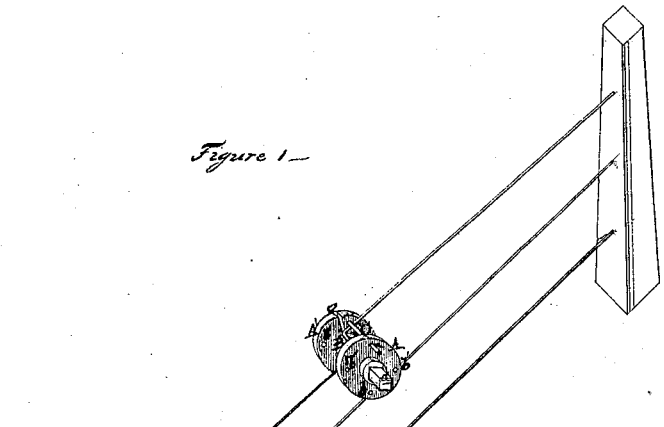
Figure 1 is a perspective view of my device.
Figure 2:
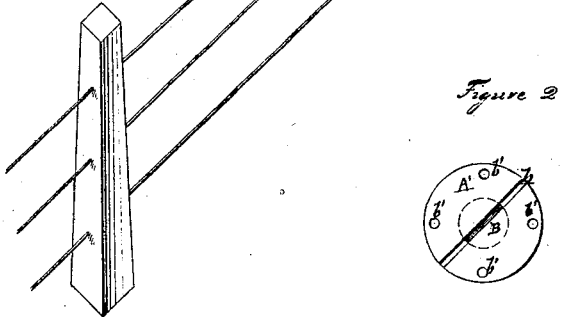
Figure 2 is a plan view of the opposite end.

The nature of this invention relates to an implement simple in its nature and economical in its construction, by means of which lines of any description may be tightened, and which will be found peculiarly useful in tightening the wires used in the construction of post and wire-fences, and in holding said wire tight after it has been secured to the posts.

The invention consists in a spool, of a peculiar construction, provided with a stop-pin and crank, as more fully hereinafter described.

In the accompanying drawing—

A A' represent the two shoulders of a spool, secured, at short distances apart, to the shaft B, one end of which, as shown, is fitted to receive the square eye of a crank, as at *a*.

An opening, *b*, like a saw-kerf, extends through the shoulder A', and extends, upon the same line, about one-third the length of the shaft.

Near the circumference of both shoulders there are a series of holes, *b'*, which are opposite to and coincident with each other, in each shoulder, to receive the pin C.

To tighten a line or wire with this device, enter the same through the opening *b*, remove the pin C and rotate the spool by means of the crank above described, which will wind the slack of the line or wire on the shaft B. When tight enough, insert the pin C behind the line or wire, through the holes *b'*, and secure the line tight after it has been secured to the post.

What I claim as my invention, and desire to secure by Letters Patent, is—

The wire-tightener above described, consisting of the shoulders A A', the shaft B, the pin C, the opening *b*, and the holes *b'*, when the several parts are constructed and arranged as described and shown, and as and for the purposes set forth.

T. CROSBY.

Witnesses:
S. C. CROSBY,
H. G. GLOVER.